(12) United States Patent
Han

(10) Patent No.: US 11,783,798 B2
(45) Date of Patent: Oct. 10, 2023

(54) DISPLAY METHOD AND DISPLAY APPARATUS

(71) Applicant: Lenovo (Beijing) Limited, Beijing (CN)

(72) Inventor: Shuang Han, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/550,505

(22) Filed: Dec. 14, 2021

(65) Prior Publication Data

US 2022/0319468 A1    Oct. 6, 2022

(30) Foreign Application Priority Data

Mar. 31, 2021 (CN) .......................... 202110349691.6

(51) Int. Cl.
*G09G 5/14*      (2006.01)

(52) U.S. Cl.
CPC ......... *G09G 5/14* (2013.01); *G09G 2300/026* (2013.01); *G09G 2340/0464* (2013.01); *G09G 2340/10* (2013.01); *G09G 2370/20* (2013.01)

(58) Field of Classification Search
CPC .. G09G 5/14; G09G 2370/20; G09G 2356/00; G09G 2340/0464; G09G 2354/00; G09G 2340/04; G09G 2360/04; G09G 2370/042; G09G 5/377; G09G 2320/0686; G09G 2340/0442; G09G 5/005; G06F 3/147; G06F 3/1446; G06F 2203/04803; H04N 21/4316; H04N 21/4122; H04N 5/45; H04N 5/2624

See application file for complete search history.

(56) References Cited

U.S. PATENT DOCUMENTS

| | | | | |
|---|---|---|---|---|
| 2002/0181597 | A1* | 12/2002 | Okada | H04N 5/783 386/E5.052 |
| 2011/0122147 | A1* | 5/2011 | Yasukawa | H04N 9/3179 345/589 |
| 2015/0054838 | A1* | 2/2015 | Koo | G09G 3/2096 345/520 |
| 2020/0302894 | A1 | 9/2020 | Khen et al. | |

* cited by examiner

*Primary Examiner* — Hau H Nguyen
(74) *Attorney, Agent, or Firm* — ANOVA LAW GROUP, PLLC

(57) ABSTRACT

A display method and a display apparatus are provided in the present disclosure. The display method, applied to a display apparatus, includes obtaining a first image signal from an electronic apparatus, where the first image signal is a signal configured for displaying on one display apparatus; according to the first image signal, outputting first image data in a first display region; obtaining first instruction, where the first instruction is configured to instruct that the first display region is at least divided into a first display sub-region and a second display sub-region; obtaining a second image signal from the electronic apparatus, where the second image signal is a signal configured for displaying on at least two display apparatuses; and according to the second image signal, outputting first sub-image data in the first display sub-region and outputting second sub-image data in the second display sub-region.

13 Claims, 7 Drawing Sheets

Before implementing the display method

After implementing the display method

Before implementing remote share screen by the display method

After implementing remote share screen by the display method

DISPLAY METHOD AND DISPLAY APPARATUS

CROSS-REFERENCE TO RELATED APPLICATION

This application claims the priority of Chinese Patent Application No. 202110349691.6, filed on Mar. 31, 2021, the content of which is incorporated herein by reference in its entirety.

TECHNICAL FIELD

The present disclosure generally relates to the field of data processing technology, and, more particularly, relates to a display method and a display apparatus.

BACKGROUND

With increase demanding in ultra-widescreen monitors, controlling one display screen to display different image source signals in split-screen may greatly improve efficiency.

Current software-based split-screen technology can be used to realize "picture-in-picture" display on one display screen, that is, to realize independent display of different image source signals in different display regions of the display screen. However, the above-mentioned software-based split-screen technology has high requirement for the operating system of the device, and a corresponding driver needs to be installed for implementation, which may cause compatibility problems with other software applications.

SUMMARY

One aspect of the present disclosure provides a display method, applied to a display apparatus. The method includes obtaining a first image signal from an electronic apparatus, where the first image signal is a signal configured for displaying on one display apparatus; according to the first image signal, outputting first image data in a first display region; obtaining first instruction, where the first instruction is configured to instruct that the first display region is at least divided into a first display sub-region and a second display sub-region; obtaining a second image signal from the electronic apparatus, where the second image signal is a signal configured for displaying on at least two display apparatuses; and according to the second image signal, outputting first sub-image data in the first display sub-region and outputting second sub-image data in the second display sub-region.

Optionally, the display method further includes, before obtaining the first image signal from the electronic apparatus, determining first configuration information, where the first configuration information is configured to be obtained by the connected electronic apparatus, thereby determining the first display region of one of the at least two display apparatuses; and before obtaining the second image signal from the electronic apparatus, determining at least two pieces of second configuration information, where the at least two pieces of the second configuration information are configured to be obtained by the electronic apparatus, thereby determining display regions of the at least two display apparatuses, where the display regions of the at least two display apparatuses at least include the first display sub-region and the second display sub-region; and the first display sub-region and the second display sub-region are configured to characterize two display apparatuses.

Optionally, the display method, after obtaining the second image signal from the electronic apparatus, further includes processing the second image signal to obtain the first sub-image data and the second sub-image data; processing the first sub-image data and the second sub-image data to obtain second image data, where a positional relationship of the first sub-image data and the second sub-image data in the second image data matches a positional relationship between the first display sub-region and the second display sub-region in the first display region; and outputting the first sub-image data in the first display sub-region and outputting the second sub-image data in the second display sub-region includes outputting the second image data, such that the first sub-image data is displayed in the first display sub-region and the second sub-image data is displayed in the second display sub-region.

Another aspect of the present disclosure provides a display apparatus. The display apparatus includes a transmission interface, configured to be connected to an electronic apparatus and obtain a first image signal or a second image signal from the electronic apparatus, where the first image signal is a signal configured for displaying on one display apparatus, and the second image signal is a signal configured for displaying on at least two display apparatuses; a display device, configured to output first image data in a first display region, or output the first image data in a first display sub-region and output second sub-image data in a second display sub-region, where the first display sub-region and the second display sub-region are sub-regions of the first display region; and a processing apparatus, configured to obtain first instruction, where the first instruction is configured to instruct that the first display region is at least divided into the first display sub-region and the second display sub-region.

Optionally, the processing apparatus is further configured to: according to the obtained first instruction, process the second image signal to obtain first sub-image data and second sub-image data; and process the first sub-image data and the second sub-image data to obtain second image data, where a positional relationship of the first sub-image data and the second sub-image data in the second image data matches a positional relationship between the first display sub-region and the second display sub-region in the first display region; and the display device is configured to output the second image data, such that the first sub-image data is displayed in the first display sub-region and the second sub-image data is displayed in the second display sub-region.

Optionally, the processing apparatus includes at least two first-protocol input interfaces and one first-protocol output interface, where the processing apparatus is configured to: obtain the second image signal through a first first-protocol input interface; process the second image signal to obtain the first sub-image data and the second sub-image data; obtain the second sub-image data outputted by the one first-protocol output interface through a second first-protocol input interface; and merge the first sub-image data and the second sub-image data into the second image data.

Optionally, the processing apparatus includes a first-protocol input interface, a first-protocol output interface, and a second-protocol input interface, and the display apparatus further includes a conversion component for converting data consistent with a first-protocol into data consistent with a second-protocol; and the conversion component includes a first-protocol input interface and a second-protocol output interface, where the processing apparatus and the conversion component are configured to: obtain, by the processing apparatus, the second image signal through the first-protocol input interface; process, by the processing apparatus, the second image signal to obtain the first sub-image data and the second sub-image data; obtain, by the conversion component, the second sub-image data through the first-protocol output interface of the processing apparatus; obtain, by the processing apparatus, the second sub-image data outputted by the conversion component through the second-protocol input interface; and merge, by the processing apparatus, the first sub-image data and the second sub-image data into the second image data.

Optionally, the processing apparatus includes a first-protocol input interface and a second-protocol input interface; the display apparatus further includes a splitting component for splitting image signals, where the splitting component includes a first-protocol input interface and at least two first-protocol output interfaces; the display apparatus includes a conversion component for converting data consistent with a first-protocol into data consistent with a second-protocol; and the conversion component includes a first-protocol input interface and a second-protocol output interface, where the splitting component, the conversion component and the processing apparatus are configured to: obtain, by the splitting component, the second image signal and perform split processing on the second image signal to obtain the first sub-image data and the second sub-image data; obtain, by the processing apparatus, the first sub-image data through the first-protocol input interface; obtain, by the conversion component, the second sub-image data; obtain, by the processing apparatus, the second sub-image data outputted by the conversion component through the second-protocol input interface; and merge, by the processing apparatus, the first sub-image data and the second sub-image data into the second image data.

Optionally, the display apparatus further includes an extraction component, where when the electronic apparatus sends mixed data including the second image signal and data content to the display apparatus, the extraction component is configured for extracting the second image signal from the mixed data including the second image signal and the data content; and the extraction component includes a third-protocol input interface and a first-protocol output interface, where the extraction component and the processing apparatus are configured to: obtain, by the extraction component, the mixed data including the second image signal and the data content through the third-protocol input interface; and send, by the extraction component, the extracted second image signal to the first-protocol input interface or the splitting component.

Optionally, the display apparatus further includes two decoding components connected in series, where the two decoding components are configured to decode an image signal from image signals for displaying on one display apparatus; a first decoding component includes a fourth-protocol input interface, a fourth-protocol output interface, and a first-protocol output interface; and a second decoding component includes a fourth-protocol input interface and a first-protocol output interface; and the two decoding components and the processing apparatus are configured to: obtain, by the first decoding component, the second image signal through the fourth-protocol input interface; process, by the first decoding component, the second image signal to obtain the first sub-image data and remaining image signals; obtain, by the processing apparatus, the first sub-image data through the first-protocol interface; obtain, by the second decoding component, the remaining image signals from the first decoding component through the fourth-protocol input interface; process, by the second decoding component, the remaining image signals to obtain the second sub-image data; obtain, by the processing apparatus, the second sub-image data through the second first-protocol interface; and merge, by the processing apparatus, the first sub-image data and the second sub-image data into the second image data.

BRIEF DESCRIPTION OF THE DRAWINGS

In order to more clearly describe the technical solutions in embodiments of the present disclosure or the existing technology, the drawings that need to be used in the description of embodiments or the existing technology are briefly described hereinafter. Obviously, the drawings in the following description are merely embodiments of the present disclosure. For those skilled in the art, other drawings may be obtained based on the provided drawings without creative work.

DETAILED DESCRIPTION

For reference and clarity, the descriptions or abbreviations of technical terms used in the following are summarized as follows.

DP is DisplayPort, which is a digital video interface standard developed by the PC and chip manufacturer alliance and standardized by the video electronics standards association.

HDMI is High-Definition Multimedia Interface, which is a fully digital video and sound transmission interface for transmitting uncompressed audio and video signals.

PCIe is peripheral component interconnect express, which is a high-speed serial computer expansion bus standard. Its original name was "3GIO", which was proposed by Intel in 2001 to replace the old PCI, PCI-X and AGP bus standards.

The technical solutions in embodiments of the present disclosure are clearly and completely described below in conjunction with the drawings in embodiments of the present disclosure. Obviously, described embodiments are only a part of embodiments of the present disclosure, rather than all embodiments. Based on embodiments in the present disclosure, all other embodiments obtained by those skilled in the art without creative work shall fall within the protection scope of the present disclosure.

Embodiments of the present disclosure may be applied to electronic apparatuses. The present disclosure does not limit the product forms of the electronic apparatuses, which may include, but may not be limited to, smart phones, tablet computers, wearable apparatuses, personal computers (PC), netbooks and the like which can be selected according to application requirements.

Figure 1:
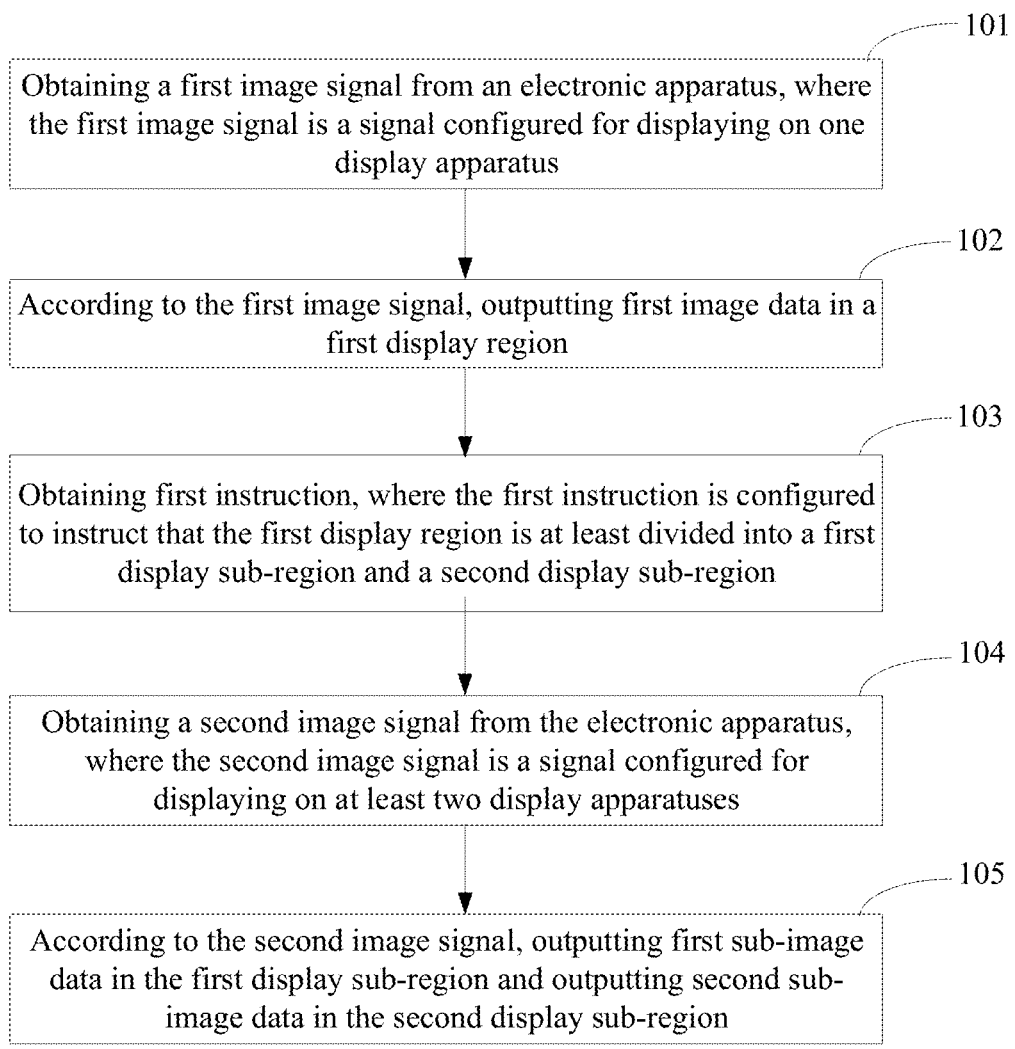
FIG. 1 illustrates a flowchart of a display method according to various disclosed embodiments of the present disclosure.

FIG. 1 illustrates a flowchart of a display method according to various disclosed embodiments of the present disclosure. The method shown in FIG. 1 is applied to a display apparatus and may divide the display screen of the display apparatus into at least two display regions that can independently perform display control on the premise that an electronic apparatus does not need to be installed with an additional driver. As shown in FIG. 1, the display method may include following steps.

At 101, the first image signal may be obtained from an electronic apparatus, where the first image signal may be a signal configured for displaying on one display apparatus.

In one embodiment, the display apparatus may obtain the first image signal from the graphics card of the electronic apparatus through a data cable, that is, obtain the first image signal through a display interface. The first image signal may be a one image signal that can be continuously outputted on one display apparatus; and its parameter information, such as resolution, may correspond to the screen parameters of the display apparatus. That is, the electronic apparatus may determine the display parameters of the display apparatus after shaking hands with the display apparatus. The graphics card of the electronic apparatus may process the image data based on determined display parameters to obtain the first image signal corresponding to the screen parameters of the display apparatus.

At 102, the first image data may be outputted in the first display region according to the first image signal.

After receiving the first image signal, the display apparatus may control the display output of the first image signal.

The first display region may be all or a part of the region of the display screen of the display apparatus; the first display region may correspondingly have an independent apparatus ID; and the apparatus ID may be uniquely identified by the electronic apparatus.

After the connection between the electronic apparatus and the display apparatus is established, the display apparatus may send the EDID (extended display identification data) file including the above-mentioned apparatus ID to the display apparatus. The EDID file may be, but may not be limited to, the content such as apparatus ID, resolution, video signal format, and the like. After receiving the EDID file corresponding to the first display region, the electronic apparatus may process and generate the first image signal that can be outputted to be displayed in the first display region based on the EDID file.

At 103, the first instruction may be obtained, where the first instruction may be configured to instruct that the first display region is at least divided into the first display sub-region and the second display sub-region.

The first instruction may be an instruction triggered and generated by a user by pressing a physical button on the display apparatus, or an instruction triggered and generated by the user by relevant software on the electronic apparatus side. After obtaining the first instruction, the display apparatus may divide the first display region into at least two sub-regions that can independently control the display content based on the hardware physical parameter of the first display region.

The first display sub-region and the second display sub-region may be combined together to become the first display region or become a partial region of the first display region. It should be noted that dividing the first display region into at least the first display sub-region and the second display sub-region may not really divide the first display region into two display regions from the hardware, but two displays may be simulated inside the display apparatus; such that the first display sub-region and the second sub-region after division may be "identified" by the electronic apparatus as two independent display devices.

The first display sub-region and the second display sub-region may respectively have independent IDs, which can be uniquely identified by the electronic apparatus. The output content on the first display sub-region and the second display sub-region may also be independently controlled without affecting each other.

At 104, the second image signal may be obtained from the electronic apparatus, where the second image signal may be a signal configured for displaying on at least two display apparatuses.

After the first display region is divided into at least the first display sub-region and the second display sub-region, each display sub-region may also have a corresponding EDID file. The EDID file may include, but may not be limited to, information such as identification name, resolution, dot pitch, contrast value, brightness value, and the like. After the first EDID file corresponding to the first display sub-region and the second EDID file corresponding to the second display sub-region are obtained by the electronic apparatus, the electronic apparatus may then process and generate at least two image signals corresponding to at least two display sub-regions based on the first EDID file and the second EDID file.

The first display region is divided into at least two display sub-regions including the first display sub-region and the second display sub-region. Therefore, the second image signal may include at least two corresponding image signals, such that one image signal may be independently displayed in one display sub-region.

It should be noted that the second image signal and the first image signal may both be transmitted by the electronic apparatus through a data line. The second image signal can contain two signal sources. Since the first display region has been divided into two display regions with independent identifications on the display apparatus side, the image signals corresponding to two signal sources may be outputted to be displayed in one display region with independent identifications respectively. Since two display regions are simulated by the display apparatus, the split-screen display solution may not require software driver on the electronic apparatus side, and there are also no special requirements for the operating system of the electronic apparatus, which is more convenient for users.

At 105, according to the second image signal, the first sub-image data may be outputted in the first display sub-region, and the second sub-image data may be outputted in the second display sub-region.

The display apparatus may process the second image signal to obtain the first sub-image data and the second sub-image data; and the first sub-image data and the second sub-image data may have different signal sources. The display apparatus may control the output display content, such that, in the final output content in the first display region, the first sub-image data may be displayed in the first display sub-region, and the second sub-image data may be displayed in the second display region.

Figure 2:
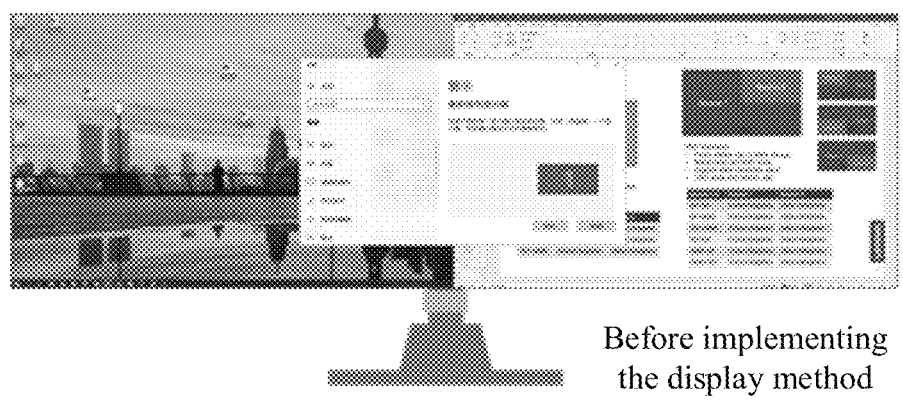
FIG. 2 illustrates display effect schematics before and after implementing a display method according to various disclosed embodiments of the present disclosure.
Figure 2:
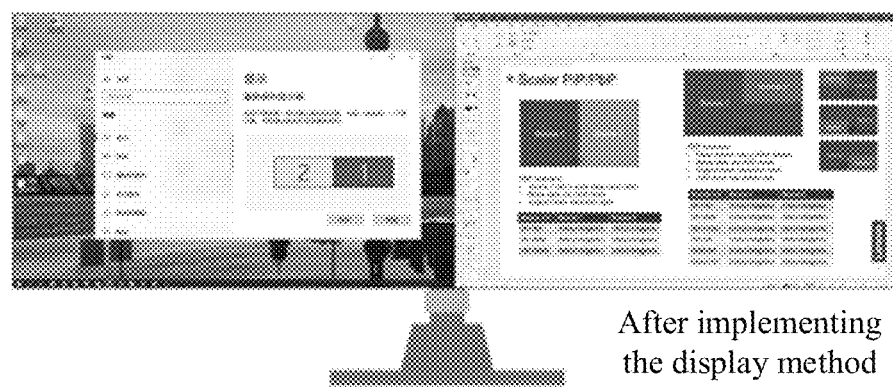

Referring to FIG. 2, FIG. 2 illustrates display effect schematics before and after implementing a display method according to various disclosed embodiments of the present disclosure. The upper image may be the first image data of the first image signal, outputted for displaying, displayed on one display apparatus, which may be entirely displayed on the display screen 1. The lower image may be the first sub-image data and the second sub-image data of the second image signal, outputted for displaying, displayed on two display apparatuses, where the first sub-image data may be displayed on the display screen 1, and the second sub-image data may be displayed on the display screen 2. The combination of the display screen 1 and the display screen 2 after the implementation of the display method may be equivalent to the display screen 1 before the implementation of the display method.

Figure 3:
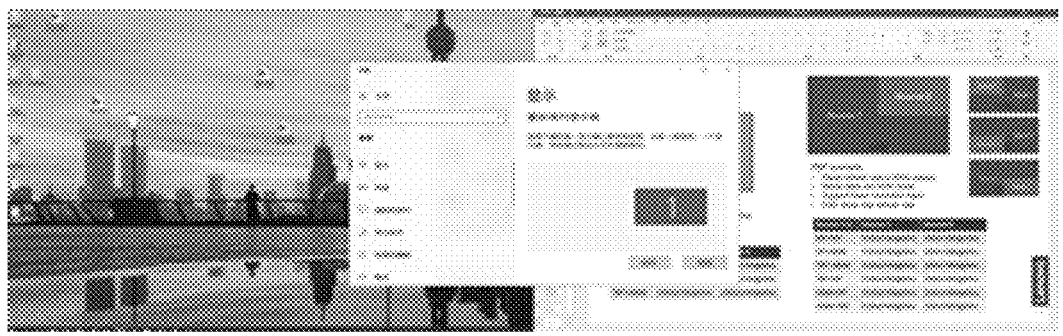
FIG. 3 illustrates shared screen schematics before and after implementing a display method according to various disclosed embodiments of the present disclosure.
Figure 3:
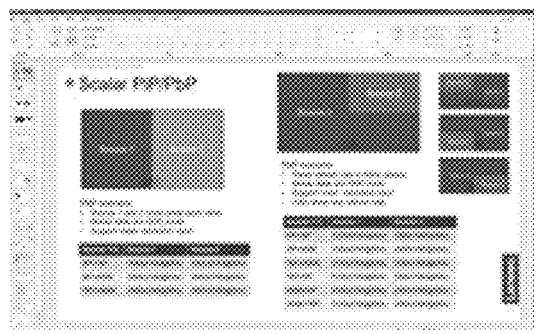

Meanwhile, after implementing split-screen display, if related content needs to be shared remotely, the content displayed on a single screen may be also selected for sharing after split-screen, and there is no need to share and display the content of the entire display screen of the display apparatus. As shown in FIG. 3, FIG. 3 illustrates shared screen schematics before and after implementing a display method according to various disclosed embodiments of the present disclosure. The content of embodiments of the present disclosure can be understood in conjunction with FIG. 2 and FIG. 3.

In the display method described in one embodiment, when the display apparatus needs to perform split-screen display, at least two displays that can independently perform display control may be simulated inside the display apparatus; and there is no need to perform special processing on the electronic apparatus side, and image processing may only need to be performed according to the configuration information provided by the display apparatus based on default logic. Therefore, such implementation may not require that the driver is installed in the electronic apparatus, and there is no special requirement for the operating system of the electronic apparatus, which may not be restricted by application programs, without software compatibility issue, such that work performance may be stable, and user experience may be desirable.

In the above-mentioned embodiments, before the electronic apparatus obtains the first image signal, the method may further include determining the first configuration information. The first configuration information can be configured to be obtained by the connected electronic apparatus, thereby determining the first display region of one display apparatus.

Correspondingly, before obtaining the second image signal from the electronic apparatus, the method may further include determining at least two pieces of the second configuration information. At least two pieces of the second configuration information may be configured to be obtained by the electronic apparatus, thereby determining at least two display apparatuses. The display regions of at least two display apparatuses may at least include the first display sub-region and the second display sub-region; and the first display sub-region and the second display sub-region may be configured to characterize two display apparatuses.

Both the first configuration information and the second configuration information may include the above-mentioned EDID. It should be understood that the first configuration information may include one EDID file corresponding to the first display region, and the second configuration information may include two EDID files respectively corresponding to the first display sub-region and the second display sub-region. The EDID file may include, but may not be limited to, parameter information such as apparatus identification, resolution, and the like. The first configuration information may only contain information of one display apparatus. Therefore, after the electronic apparatus obtains the first configuration information, the first image signal processed by the graphics card may be only used for being displayed on one display apparatus. The second configuration information may contain information of two display apparatuses. Therefore, after the electronic apparatus obtains the second configuration information, the second image signal processed by the graphics card may be used for being displayed on two display apparatuses.

It should be noted that the first configuration information may be obtained by the electronic apparatus after establishing connection with the display apparatus for the first time, and the second configuration information may be obtained by the electronic apparatus after establishing connection with the display apparatus for the second time.

For example, before obtaining the first configuration information, the electronic apparatus may be physically connected to the display apparatus, where the electronic apparatus may obtain the first configuration information from no connection to physical connection. If the display apparatus obtains the first instruction, the display apparatus may send the electronic apparatus a signal, that is, a hot-swappable signal, indicating disconnection and physical re-connection while maintaining the physical connection with the electronic apparatus. Therefore, the electronic apparatus may obtain the second configuration information after obtaining the hot-swappable signal indicating disconnection and physical re-connection.

Figure 4:
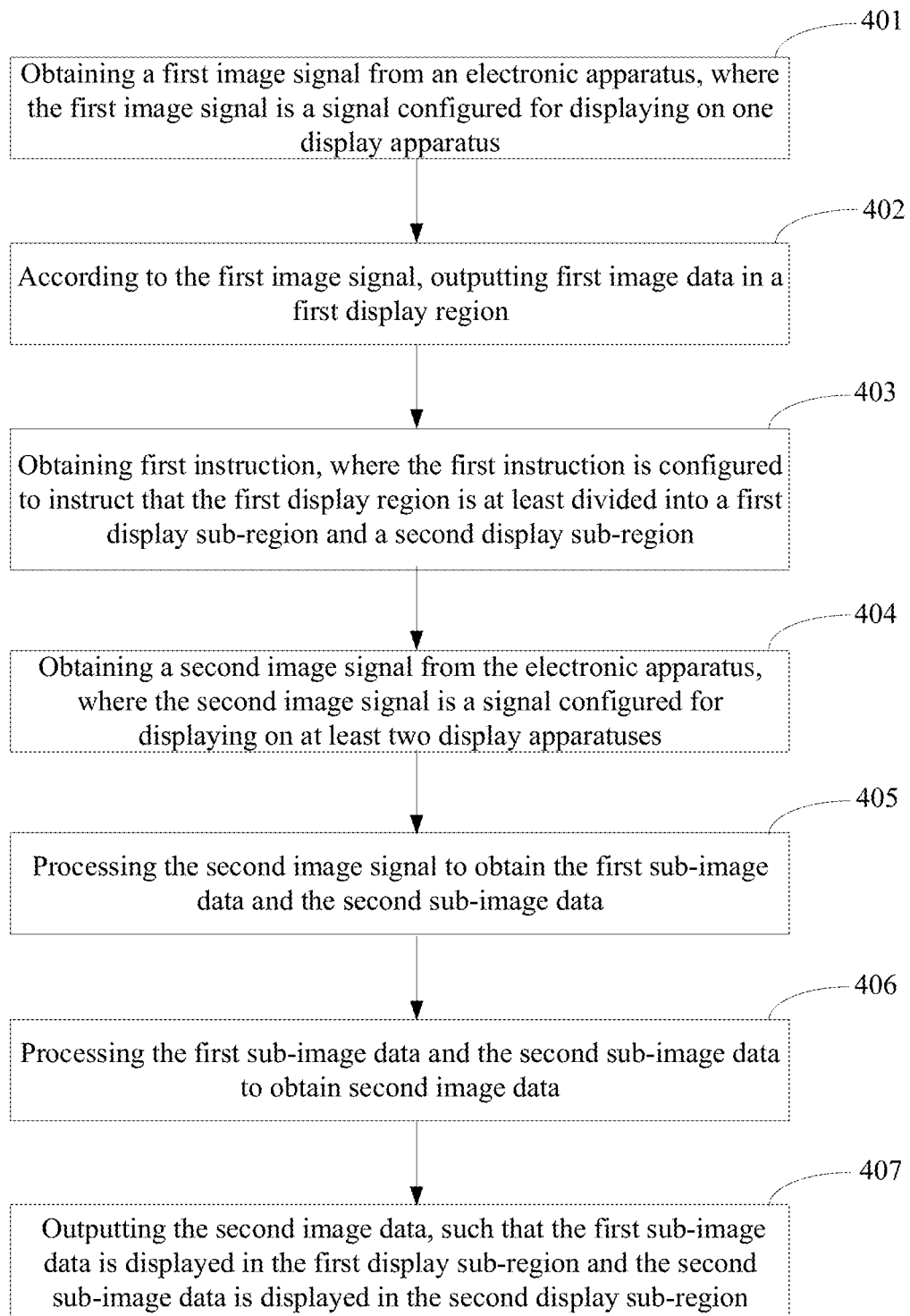
FIG. 4 illustrates another flowchart of a display method according to various disclosed embodiments of the present disclosure.

FIG. 4 illustrates another flowchart of a display method according to various disclosed embodiments of the present disclosure. As shown in FIG. 4, in another implementation, the display method may include following steps.

At 401, the first image signal may be obtained from the electronic apparatus, where the first image signal may be a signal configured for display on one display apparatus.

At 402, the first image data may be outputted in the first display region according to the first image signal.

At 403, the first instruction may be obtained, where the first instruction may be configured to instruct that the first display region is at least divided into the first display sub-region and the second display sub-region.

At 404, the second image signal may be obtained from the electronic apparatus, where the second image signal may be a signal configured for display on at least two display apparatuses.

At 405, the second image signal may be processed to obtain the first sub-image data and the second sub-image data.

The second image signal may be also transmitted from the electronic apparatus through a data line, and the second image signal may include two image signals that can be used to display on two display apparatuses. Therefore, after receiving the second image signal, the display apparatus may need to first identify and extract two image signals that are mixed and transmitted, thereby obtaining separated first sub-image data and second sub-image data.

At 406, the first sub-image data and the second sub-image data may be processed to obtain the second image data.

The positional relationship of the first sub-image data and the second sub-image data in the second image data may match the positional relationship between the first display sub-region and the second display sub-region in the first display region.

The first display sub-region and the second display sub-region may both belong to the first display region, and the content outputted from the first display region may include the first sub-image data and the second sub-image data. Therefore, the first sub-image data and the second sub-image data may need to be spliced to obtain the second image data. In such way, the second image data may be controlled to be outputted in the first display region, so that the first sub-image data may be displayed in the first display sub-region, and the second sub-image data may be displayed in the second display sub-region.

At 407, the second image data may be outputted, such that the first sub-image data may be displayed in the first display sub-region and the second sub-image data may be displayed in the second display sub-region.

In one embodiment, after receiving the second image signal, the second image signal may be first processed into the first sub-image data and the second sub-image data; and the first sub-image data and the second sub-image data may then be spliced into the second image data, which may directly control the display of the second image data in the first display region. Therefore, it may realize the effect that one display screen may be divided into two independent display regions, and two independent display regions may display different content sources.

For above-mentioned method embodiments, for simplicity, these embodiments are all expressed as a series of action combinations. However, those skilled in the art should know that the present disclosure is not limited by the described sequence of actions, because according to the present disclosure, certain steps may be performed in other sequences or simultaneously. Secondly, those skilled in the art should also know that embodiments described in the present disclosure may all be optional embodiments, and the actions and modules involved may not be necessarily required by the present disclosure.

Above-mentioned embodiments disclosed in the present disclosure describe the method in detail. The method of the present disclosure may be implemented by various forms of physical equipment. Therefore, the present disclosure also discloses an apparatus, and various embodiments are provided in detail hereinafter.

Figure 5:
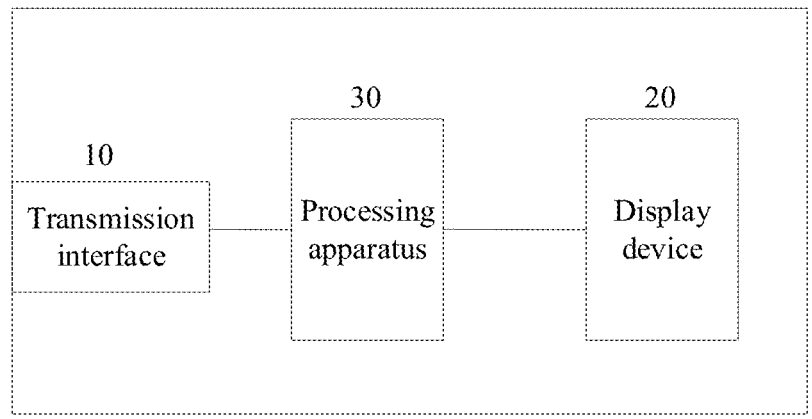
FIG. 5 illustrates a structural schematic of a display apparatus according to various disclosed embodiments of the present disclosure.

FIG. 5 illustrates a structural schematic of a display apparatus according to various disclosed embodiments of the present disclosure. Referring to FIG. 5, the display apparatus may include a transmission interface 10 which is configured to be connected with the electronic apparatus and obtains the first image signal or the second image signal from the electronic apparatus, where the first image signal may be a signal configured for displaying on one display apparatus, and the second image signal may be a signal configured for displaying on at least two display apparatuses.

The display apparatus may further include a display device 20 which is configured to output the first image data in the first display region or output the first sub-image data in the first display sub-region and output the second sub-image data in the second display sub-region, where the first display sub-region and the second display sub-region are sub-regions of the first display region.

The display apparatus may further include a processing apparatus 30 which is configured to obtain the first instruction, where the first instruction may be configured to instruct that the first display region is at least divided into the first display sub-region and the second display sub-region.

The types of the transmission interface 10 may not be fixed limited and may be interfaces supporting different protocol types. The transmission interface may be, but may not be limited to, any one of a DP interface, an HDMI interface, an USB interface, and a Thunderbolt interface.

The processing apparatus 30 may receive the first image signal from the electronic apparatus through the transmission interface 10, then control the display device 20 to perform output display of the first image signal, and the display device may control the output of the first image data in the first display region based on the preset configuration information.

After obtaining the first instruction, the processing apparatus 30 may at least divide the first display region into the first display sub-regions and the second display sub-regions. The first display sub-region and the second display sub-region may have corresponding independent configuration information, and the configuration information may include, but may not be limited to, identification information and resolution.

After the electronic apparatus obtains the configuration information of the first display sub-region and the second display sub-region, it is determined that there are two display apparatuses, such that the second image signal including two image signals that can be displayed on two display apparatuses may be processed and transmitted to the display apparatus through the transmission interface 10.

After receiving the second image signal through the transmission interface 10, the processing apparatus 30 of the display apparatus may process the second image signal accordingly into the image data including the first sub-image data and the second sub-image data, and then control the display device 20 to output the display of the processed image data. Among the outputted image data, the first sub-image data may be displayed in the first display sub-region, and the second sub-image data may be displayed in the second display sub-region.

When the display apparatus in one embodiment needs to perform split-screen display, at least two displays that can independently perform display control may be simulated inside the display apparatus. Such implementation may not require that the driver is installed in the electronic apparatus, and there is no special requirement for the operating system of the electronic apparatus, which may not be restricted by application programs, without software compatibility issue, such that work performance may be stable, and user experience may be desirable.

On the basis of above-mentioned embodiments, the display apparatus may further include a storage apparatus for storing the first configuration information and at least two pieces of second configuration information. The first configuration information may be configured to be obtained by the connected electronic apparatus, so that the electronic apparatus may determine the first display region of the display apparatus. At least two pieces of second configuration information may be configured to be obtained by the electronic apparatus, such that the electronic apparatus may determine at least two display apparatuses. The display regions of at least two display apparatuses may at least include the first display sub-region and the second display sub-region; and the first display sub-region and the second display sub-region may be configured to characterize two display apparatuses. The significance and function of the first configuration information and the second configuration information may refer to the description of relevant parts in method embodiments, which may not be described in detail herein.

In above-mentioned embodiments, it has been described that the processing apparatus 30 may process the second image signal. For example, the processing apparatus may be configured to process the second image signal according to obtained first instruction to obtain the first sub-image data and the second sub-image data; and process the first sub-image data and the second sub-image data to obtain the second image data.

The positional relationship of the first sub-image data and the second sub-image data in the second image data may match the positional relationship between the first display sub-region and the second display sub-region in the first display region.

The display device 20 may be configured to, for example, output the second image data, such that the first sub-image data may be displayed in the first display sub-region, and the second sub-image data may be displayed in the second display sub-region.

As disclosed above, in an implementation, the processing apparatus 30 may include at least two first-protocol input interfaces and one first-protocol output interface. Therefore, the processing apparatus 30 may be configured to obtain the second image signal through the first first-protocol input interface; process the second image signal to obtain the first sub-image data and the second sub-image data; obtain the second sub-image data outputted by the first-protocol output interface through the second first-protocol input interface; and merge the first sub-image data and the second sub-image data into second image data.

Figure 6:
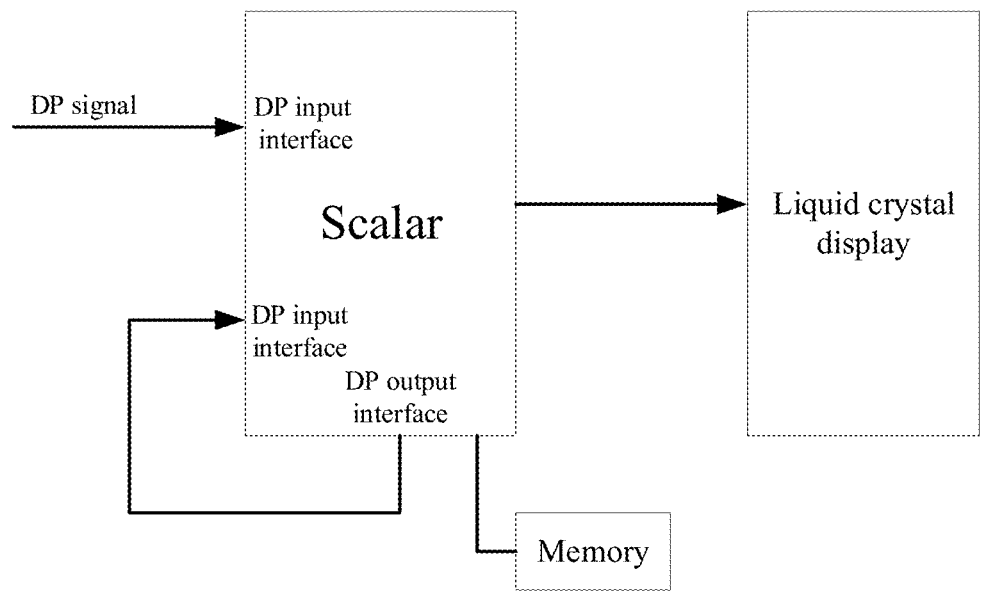
FIG. 6 illustrates a hardware implementation schematic of a display apparatus according to various disclosed embodiments of the present disclosure.

The communication interface between the display apparatus and the electronic apparatus is the DP interface, the first protocol is the DP protocol, and the processing apparatus is the scalar chip as an example for illustration. FIG. 6 illustrates a hardware implementation schematic of a display apparatus according to various disclosed embodiments of the present disclosure. The memory in the display apparatus may be configured to store configuration information of the first display sub-region and the second display sub-region, such that the scalar chip may call the configuration information and perform corresponding processing on received second image signal.

As shown in FIG. 6, the second image signal may be a DP signal, which is inputted to the scalar chip from the first DP input interface of the scalar chip; the scalar chip may process the DP signal into two image signals, retain the first image signal, output the second image signal from the DP output interface, and then input the second image signal into the scalar chip from the second DP input interface; and the scalar chip may then merge and splice two independently transmitted image signals to obtain the second image data which may be outputted to the LCD panel for performing display output.

In above-mentioned implementation, the second image signal may need to be outputted from the DP output interface and inputted into the scalar chip through the second DP input interface. The scalar chip itself may support the input and output of the DP signal, and may realize the division, redirection and merging of the image signal inside the scalar chip.

In another implementation, the processing apparatus 30 may include a first-protocol input interface, a first-protocol output interface, and a second-protocol input interface. The display apparatus may further include a conversion component for converting data consistent with the first protocol into data consistent with the second protocol. The conversion component may have a first-protocol input interface and a second-protocol output interface. Therefore, the processing apparatus 30 and the conversion component may be configured as the following. The processing apparatus may obtain the second image signal through the first-protocol input interface; the processing apparatus may process the second image signal to obtain the first sub-image data and the second sub-image data; the conversion component may obtain the second sub-image data through the first-protocol output interface of the processing apparatus; the processing apparatus may obtain the second sub-image data outputted by the conversion component through the second-protocol input interface; and the processing apparatus may merge the first sub-image data and the second sub-image data into the second image data.

Figure 7:
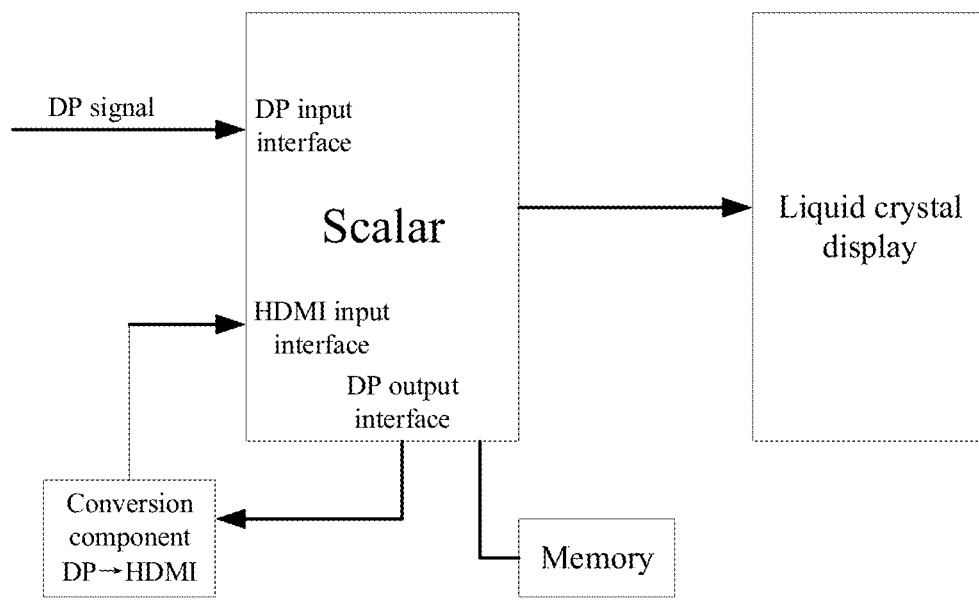
FIG. 7 illustrates a hardware implementation schematic of a display apparatus according to various disclosed embodiments of the present disclosure.

The communication interface between the display apparatus and the electronic apparatus is the DP interface, the first protocol is the DP protocol, the second protocol is the HDMI protocol, and the processing apparatus is the scalar chip still as an example for illustration. FIG. 7 illustrates a hardware implementation schematic of a display apparatus according to various disclosed embodiments of the present disclosure. Referring to FIG. 7, the second image signal may be a DP signal, which is inputted to the scalar chip from the DP input interface of the scalar chip; the scalar chip may process the DP signal into two image signals, retain the first image signal, and output the second image signal from the DP output interface to the conversion component that can convert the DP signal to the HDMI signal; the conversion component may input the converted second image signal into the scalar chip from the HDMI input interface; and the scalar chip may then merge and splice two independently transmitted image signals to obtain the second image data, which may be outputted to the LCD panel for performing display output.

In another implementation, the processing apparatus 30 may have a first-protocol input interface and a second-protocol input interface; the processing apparatus may also include a splitting component for splitting the image signal; the splitting component may include the first-protocol input interface and at least two first-protocol output interfaces, and the display apparatus may include a conversion component that converts data consistent with the first-protocol into data consistent with the second-protocol; and the conversion component may have a first-protocol input interface and a second-protocol output interface. Then, the splitting component, the conversion component and the processing apparatus may be configured as the following. The splitting component may obtain the second image signal and perform split processing on obtained second image signal to obtain the first sub-image data and the second sub-image data; the processing apparatus may obtain the first sub-image data through the first-protocol input interface; the conversion component may obtain the second sub-image data; the processing apparatus may obtain the second sub-image data outputted by the conversion component through the second-protocol input interface; and the processing apparatus may merge the first sub-image data and the second sub-image data into the second image data.

Figure 8:
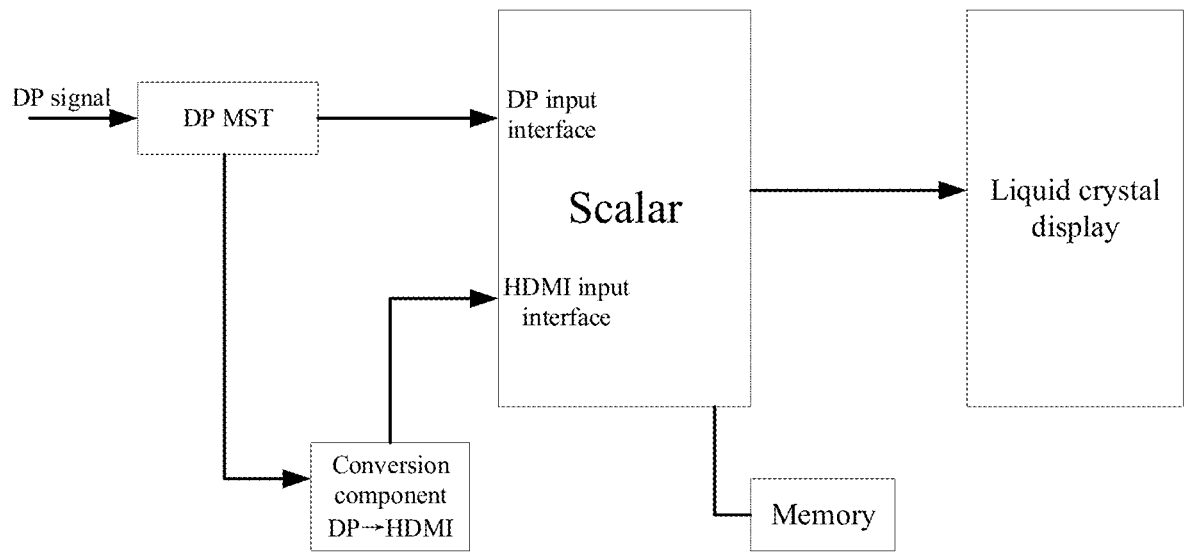
FIG. 8 illustrates a hardware implementation schematic of a display apparatus according to various disclosed embodiments of the present disclosure.

The communication interface between the display apparatus and the electronic apparatus may be the DP interface, the first protocol may be the DP protocol, the second-protocol may be the HDMI protocol, the processing apparatus may be the scalar chip, and the splitting component may be the DP MST (DisplayPort Multi Stream Transporter processor) still as an example for illustration. FIG. 8 illustrates a hardware implementation schematic of a display apparatus according to various disclosed embodiments of the present disclosure. Referring to FIG. 8, the second image signal may be a DP signal, which is inputted to DP MST; DP MST may split the second image signal into two independent image signals including the first image signal and the second image signal respectively; the first image signal may be inputted to the scalar chip from the DP input interface of the scalar chip; the second image signal may be inputted to the conversion component; after the conversion component converts the protocol format of the second image signal, and the converted second image signal may be inputted to the scalar chip through the HDMI input interface; and the scalar chip may then merge and splice two independently transmitted image signals to obtain the second image data, which may be outputted to the liquid crystal display for performing display output.

The above-mentioned implementations may not require any changes to existing electronic equipment, including hardware, software, BIOS, and the like, which may not only do not require additional cost, but also be convenient for users, with a desirable application significance.

Based on above-mentioned embodiments, in one implementation, the electronic apparatus may send mixed data including the second image signal and data content to the display apparatus. The display apparatus may further include an extraction component for extracting the second image signal from the mixed data including the data content and the image signal. The extraction component may include a third-protocol input interface and a first-protocol output interface. The extraction component and the processing apparatus may be configured as the following. The extraction component may obtain the mixed data including data content and the second image signal through the third-protocol input interface; and the extraction component may send the extracted the second image signal to the first-protocol input interface or the splitting component.

Figure 9:
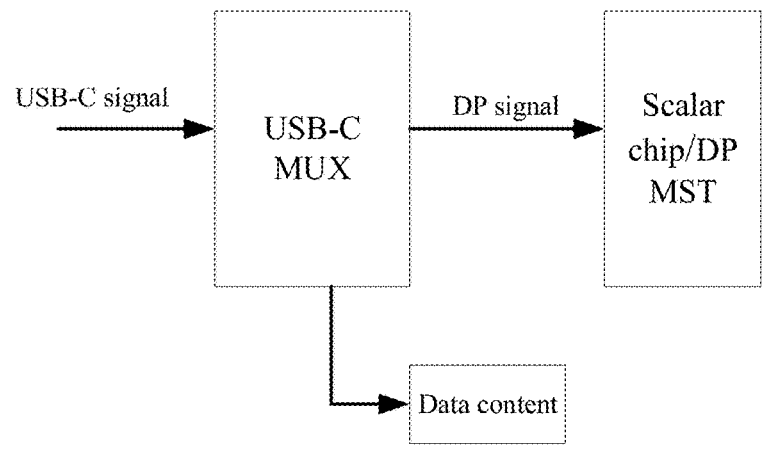
FIG. 9 illustrates a hardware implementation schematic of a display apparatus according to various disclosed embodiments of the present disclosure.

Taking the communication interface between the display apparatus and the electronic apparatus as a USB Type-C (USB-C for short) interface as an example, the electronic apparatus may transmit the mixed data through the USB-C interface; and the third-protocol that is consistent with the mixed data including the second image signal and the data content may be the USB-C protocol. The extraction component may be a USB-C MUX (data selector) chip, which may receive the mixed data from the USB-C interface, separate the second image signal and data content, and transmit the second image signal to the processing apparatus for processing. Referring to FIG. 9, FIG. 9 illustrates a hardware implementation schematic of a display apparatus according to various disclosed embodiments of the present disclosure. The above-mentioned description may be understood in conjunction with FIG. 9. Since the second image signal in the USB-C can be a DP signal, the USB-C MUX may be directly added in front of the scalar chip or DP MST in implementations described in above-mentioned embodiments.

In another implementation, the display apparatus may further include two decoding components connected in series, and the decoding components may be configured to decode an image signal from image signals for displaying on one display apparatus. The first decoding component may include a fourth-protocol input interface, a fourth-protocol output interface, and a first-protocol output interface; and the second decoding component may include a fourth-protocol input interface and a first-protocol output interface. The decoding components and the processing apparatus may be configured as the following. The first decoding component may obtain the second image signal through the fourth-protocol input interface; the first decoding component may process the second image signal to obtain the first sub-image data and remaining image signals; the processing apparatus may obtain the first sub-image data through the first-protocol interface; the second decoding component may obtain the remaining image signals from the first decoding component through the fourth-protocol input interface; the second decoding component may process the remaining image signals to obtain the second sub-image data; the processing apparatus may obtain the second sub-image data through the second first-protocol interface; and the processing apparatus may merge the first sub-image data and the second sub-image data into the second image data.

Figure 10:
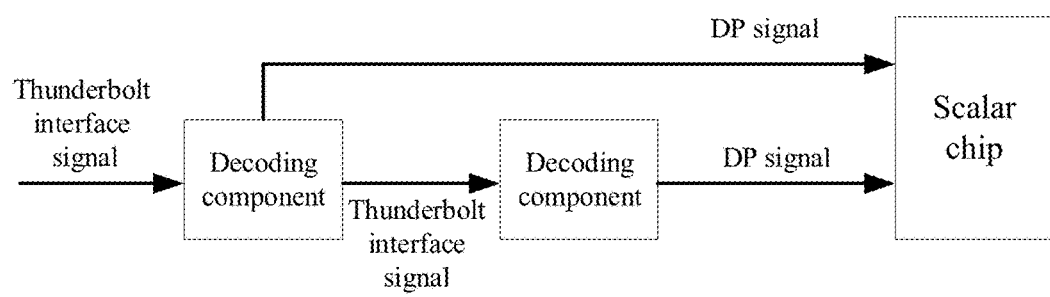
FIG. 10 illustrates a hardware implementation schematic of a display apparatus according to various disclosed embodiments of the present disclosure.

The communication interface between the display apparatus and the electronic apparatus may be a Thunderbolt interface, the fourth-protocol may be the protocol applicable to the Thunderbolt interface as an example for illustration. Since the PCIe signal is transmitted in the Thunderbolt interface, the decoding component may be required to decode the signal. The decoding component may be a decoding component that can decode a DP signal from the signal transmitted by the Thunderbolt interface. FIG. 10 illustrates a hardware implementation schematic of a display apparatus according to various disclosed embodiments of the present disclosure. The electronic apparatus may transmit the second image signal consistent with the Thunderbolt interface protocol to the first one of two cascaded decoding components through the Thunderbolt interface. The first decoding component may decode the first image signal consistent with the DP protocol, which is transmitted to the scalar chip, and transmit remaining signals to the second decoding component. The second decoding component may decode the second image signal consistent with the DP protocol from received signals, which is transmitted to the scalar chip.

Various implementations of processing the second image signal by the display apparatus above are all exemplary and do not constitute a restriction on the processing of the second image signal by the display apparatus. In practical applications, implementation methods may be adaptively determined based on the hardware configuration in the display apparatus and the types of communication interfaces between the display apparatus and the electronic apparatus.

Figure 11:
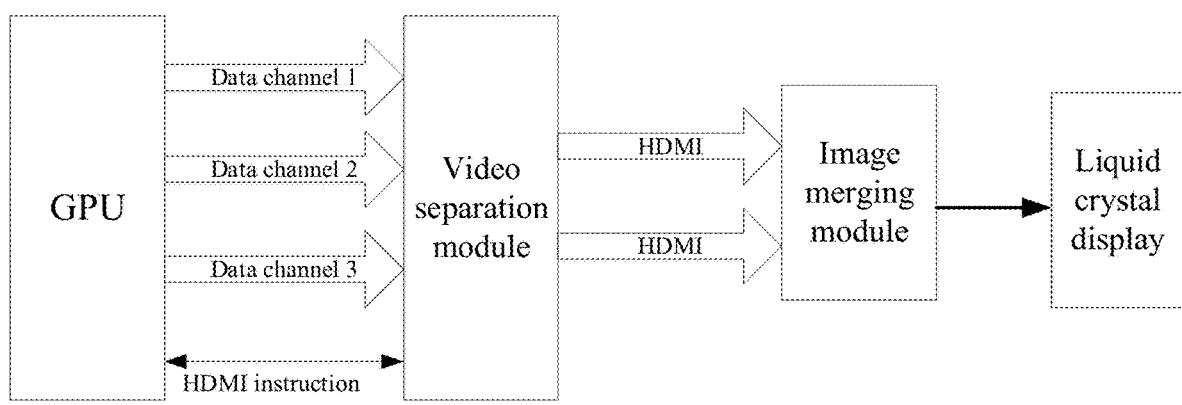
FIG. 11 illustrates an implementation principle schematic of structural modules of an electronic apparatus and a display apparatus according to various disclosed embodiments of the present disclosure.

In order to better understand the process of the display apparatus to display two sets of independent image signals on a split screen, the HDMI interface may be as an example for the communication interface between the electronic apparatus and the display apparatus. FIG. 11 illustrates an implementation principle schematic of structural modules of an electronic apparatus and a display apparatus according to various disclosed embodiments of the present disclosure. Referring to FIG. 11, the EEPROM (memory) may pre-store the configuration information of the first display sub-region and the second display sub-region; the video separation module may retrieve the EEPROM information, and transmit relevant information to the graphics processor GPU on the side of the electronic apparatus through the HDMI command channel; the GPU may generate image signals for display on two displays according to the configuration information, and allocate the image signals to three HDMI data channels according to bandwidth requirements, where each data channel may only be used to transmit one image signal, and two image signals may not be mixed and transmitted; after the video separation module on the display apparatus side receives the image data from the GPU, the video separation module may separate two independent image signals and generate the standard HDMI format; and the image merging module may merge two HDMI format images into the second image data, and outputs the second image data to the liquid crystal display. The above-mentioned content may be understood in conjunction with one embodiment.

When the display apparatus in one embodiment needs to perform split-screen display, at least two displays that can independently perform display control may be simulated inside the display apparatus. Such implementation may not require that the driver is installed in the electronic apparatus, and there is no special requirement for the operating system of the electronic apparatus, which may not be restricted by application programs, without software compatibility issue, such that work performance may be stable, and user experience may be desirable.

Various embodiments in the present disclosure are described in a progressive manner. Each embodiment may focus on the differences from other embodiments, and same or similar parts between various embodiments may be referred to each other. The apparatuses disclosed in various embodiments correspond to the methods disclosed in various embodiments, the description of the apparatuses may be relatively simple, and relevant parts may refer to the description of method embodiments.

It should also be noted that in the present disclosure, relational terms such as first, second and the like may be merely used to distinguish one entity or operation from another entity or operation and may not necessarily require or imply any such actual relationship or order between these entities or operations. Moreover, the terms "include", "contain" or any other variations thereof may be intended to cover non-exclusive inclusion, so that an article or equipment including a series of elements may not only include those elements, but also include other elements not explicitly listed, or also include elements inherent to such an article or equipment. If there are no more restrictions, the element defined by the sentence "include a . . . " may not exclude the existence of other same elements in the article or equipment that includes the above elements.

Steps of the method or algorithm described in various embodiments disclosed in the present disclosure can be directly implemented by hardware, a software module executed by a processor, or a combination thereof. Software modules may be stored in random access memory (RAM), internal memory, read-only memory (ROM), electrically programmable ROM, electrically erasable programmable ROM, registers, hard disks, removable disks, CD-ROM, or in any other form of storage medium known in the technical field.

The above description of disclosed embodiments enables those skilled in the art to implement or use the present disclosure. Various modifications to these embodiments may be obvious to those skilled in the art, and the general principles defined herein may be implemented in other embodiments without departing from the spirit or scope of the present disclosure. Therefore, the present disclosure may not be limited to various embodiments shown in the present disclosure but should conform to the widest scope consistent with the principles and novel features disclosed in the present disclosure.

What is claimed is:

1. A display method, applied to a display apparatus, comprising:
    receiving a first image signal from an electronic apparatus, wherein the first image signal is a signal configured for displaying on one display apparatus;
    according to the first image signal, outputting first image data in a first display region;
    obtaining first instruction, wherein the first instruction is configured to instruct that the first display region is at least divided into a first display sub-region and a second display sub-region;
    receiving a second image signal from the electronic apparatus, wherein the second image signal is a signal configured for displaying on at least two display apparatuses;
    separating the second image signal into a first sub-image signal corresponding to the first display sub-region and a second sub-image signal corresponding to the second display sub-region; and
    outputting the first sub-image signal to display in the first display sub-region and outputting the second sub-image signal to display in the second display sub-region.

2. The display method according to claim 1, before receiving the first image signal from the electronic apparatus, further including:
    determining first configuration information, wherein the first configuration information is configured to be obtained by a connected electronic apparatus, thereby determining the first display region of the one display apparatus.

3. The display method according to claim 1, before receiving the second image signal from the electronic apparatus, further including:
    determining at least two pieces of second configuration information, wherein the at least two pieces of the second configuration information are configured to be obtained by the electronic apparatus, thereby determining display regions of the at least two display apparatuses, the display regions of the at least two display apparatuses at least include the first display sub-region and the second display sub-region, and the first display sub-region and the second display sub-region are configured to characterize two display apparatuses.

4. The display method according to claim 1, after receiving the second image signal from the electronic apparatus, further including:
    processing the first sub-image signal and the second sub-image signal to obtain second image data, wherein a positional relationship of the first sub-image signal and the second sub-image signal in the second image data matches a positional relationship between the first display sub-region and the second display sub-region in the first display region; and
    outputting the second image data, such that the first sub-image signal is displayed in the first display sub-region and the second sub-image signal is displayed in the second display sub-region.

5. The display method according to claim 1, wherein the first image signal and the second image signal are received by the display apparatus from the electronic apparatus through a single data cable.

6. A display apparatus, comprising:
a transmission interface, configured to be connected to an electronic apparatus and receive a first image signal or a second image signal from the electronic apparatus, wherein the first image signal is a signal configured for displaying on one display apparatus, and the second image signal is a signal configured for displaying on at least two display apparatuses;
a processing apparatus, configured to:
obtain first instruction, wherein the first instruction is configured to instruct that the first display region is at least divided into a first display sub-region and a second display sub-region; and
separate the second image signal into a first sub-image signal corresponding to the first display sub-region, and a second sub-image signal corresponding to the second display sub-region; and
a display device, configured to output first image data in a first display region according to the first image signal, or output the first sub-image signal to display in the first display sub-region and output second sub-image signal to display in the second display sub-region.

7. The display apparatus according to claim 6, wherein:
the processing apparatus is further configured to:
process the first sub-image signal and the second sub-image signal to obtain second image data, wherein a positional relationship of the first sub-image signal and the second sub-image signal in the second image data matches a positional relationship between the first display sub-region and the second display sub-region in the first display region; and
the display device is configured to:
output the second image data, such that the first sub-image signal is displayed in the first display sub-region and the second sub-image signal is displayed in the second display sub-region.

8. The display apparatus according to claim 7, wherein:
the processing apparatus includes at least two first-protocol input interfaces and one first-protocol output interface, wherein the processing apparatus is configured to:
receive the second image signal through a first first-protocol input interface;
separate the second image signal into the first sub-image signal and the second sub-image signal;
receive the second sub-image signal outputted by the one first-protocol output interface through a second first-protocol input interface; and
merge the first sub-image signal and the second sub-image signal into the second image data.

9. The display apparatus according to claim 8, further including:
an extraction component, wherein:
when the electronic apparatus sends mixed data including the second image signal and data content to the display apparatus, the extraction component is configured for extracting the second image signal from the mixed data including the second image signal and the data content; and
the extraction component includes a third-protocol input interface and a first-protocol output interface, wherein the extraction component and the processing apparatus are configured to:
receive, by the extraction component, the mixed data including the second image signal and the data content through the third-protocol input interface; and
send, by the extraction component, the extracted second image signal to the first-protocol input interface or the splitting component.

10. The display apparatus according to claim 7, wherein:
the processing apparatus includes a first-protocol input interface, a first-protocol output interface, and a second-protocol input interface, the display apparatus further includes a conversion component for converting data consistent with a first protocol into data consistent with a second protocol, and the conversion component includes a first-protocol input interface and a second-protocol output interface, the processing apparatus and the conversion component are configured to:
receive, by the processing apparatus, the second image signal through the first-protocol input interface;
separate, by the processing apparatus, the second image signal into the first sub-image signal and the second sub-image signal;
receive, by the conversion component, the second sub-image signal through the first-protocol output interface of the processing apparatus;
receive, by the processing apparatus, the second sub-image signal outputted by the conversion component through the second-protocol input interface; and
merge, by the processing apparatus, the first sub-image signal and the second sub-image signal into the second image data.

11. The display apparatus according to claim 7, wherein:
the processing apparatus includes a first-protocol input interface and a second-protocol input interface;
the display apparatus further includes a splitting component for splitting image signals, wherein the splitting component includes a first-protocol input interface and at least two first-protocol output interfaces;
the display apparatus includes a conversion component for converting data consistent with a first-protocol into data consistent with a second-protocol; and
the conversion component includes a first-protocol input interface and a second-protocol output interface, wherein the splitting component, the conversion component and the processing apparatus are configured to:
receive, by the splitting component, the second image signal and perform split processing on the second image signal to obtain the first sub-image signal and the second sub-image signal;
receive, by the processing apparatus, the first sub-image signal through the first-protocol input interface;
receive, by the conversion component, the second sub-image signal;
receive, by the processing apparatus, the second sub-image signal outputted by the conversion component through the second-protocol input interface; and
merge, by the processing apparatus, the first sub-image signal and the second sub-image signal into the second image data.

12. The display apparatus according to claim 7, further including: two decoding components connected in series, wherein:
the two decoding components are configured to decode an image signal from image signals for displaying on one display apparatus;

a first decoding component includes a fourth-protocol input interface, a fourth-protocol output interface, and a first-protocol output interface; and a second decoding component includes a fourth-protocol input interface and a first-protocol output interface.

13. The display apparatus according to claim 12, wherein:

the two decoding components and the processing apparatus are configured to:

receive, by the first decoding component, the second image signal through the fourth-protocol input interface;

separate, by the first decoding component, the second image signal to obtain into the first sub-image signal and remaining image signals;

receive, by the processing apparatus, the first sub-image signal through the first-protocol interface;

receive, by the second decoding component, the remaining image signals from the first decoding component through the fourth-protocol input interface;

process, by the second decoding component, the remaining image signals to obtain the second sub-image signal;

receive, by the processing apparatus, the second sub-image signal through the second first-protocol interface; and merge, by the processing apparatus, the first sub-image signal and the second sub-image signal into the second image data.

* * * * *